Sept. 1, 1970   N. S. IVERSON   3,526,150
VARIABLE PITCH PULLEY
Filed Jan. 23, 1969
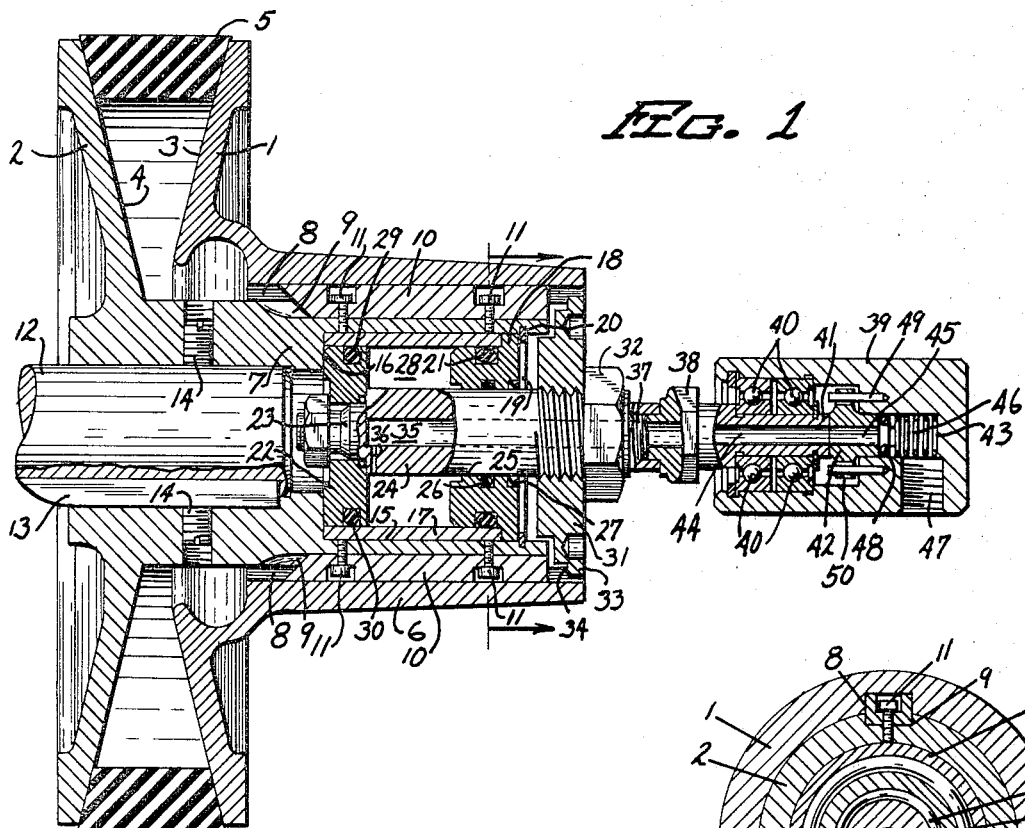
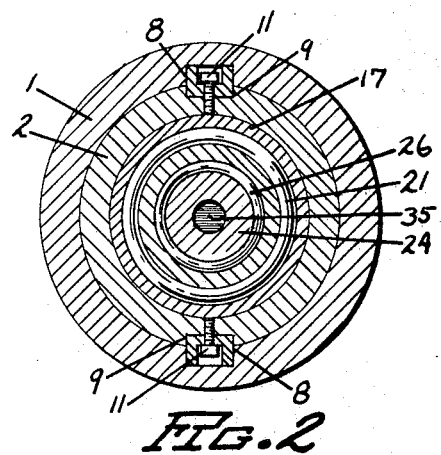
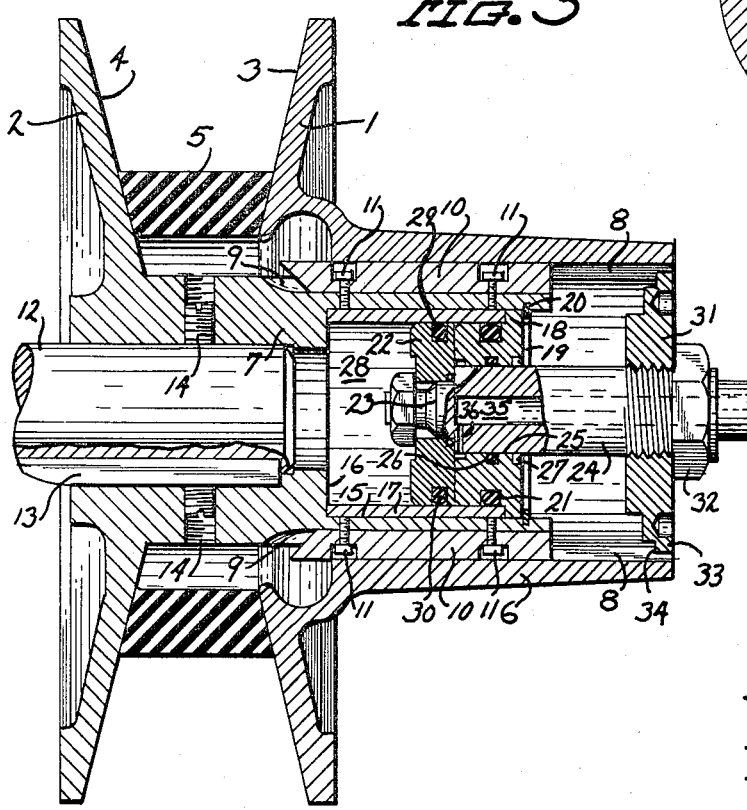
INVENTOR.
Noel S. Iverson
BY
Merchant & Gould
ATTORNEYS United States Patent Office 3,526,150
Patented Sept. 1, 1970

3,526,150
VARIABLE PITCH PULLEY
Noel S. Iverson, New Ulm, Minn., assignor to New Ulm Manufacturing, New Ulm, Minn., a corporation of Minnesota
Filed Jan. 23, 1969, Ser. No. 793,294
Int. Cl. F16h 55/56
U.S. Cl. 74—230.17
7 Claims

ABSTRACT OF THE DISCLOSURE

An infinitely variable pitch pulley including a pair of opposed coaxial cone flanges having telescoping hubs enclosing fluid pressure operated mechanism for moving one of the cone flanges axially relative to the other cone flange to vary the effective pitch diameter thereof relative to a V-belt entrained between the cone flanges.

BACKGROUND OF THE INVENTION

Variable pitch V-belt pulleys heretofore produced utilized various mechanical devices for moving the cone flanges thereof axially toward and away from each other to vary their effective pitch diameters. Some use shifter forks in engagement with collars attached to one of the cone flanges, with or without the assistance of spring means. Many of these require considerable space and are cumbersome and not easily adjustable, particularly from an operator's station remote from the pulley.

SUMMARY OF THE INVENTION

An important object of this invention is the provision of a variable pitch pulley having compact and relatively simple means for varying the effective pitch diameter thereof, and the operation of which can be precisely controlled from a remote operator's station.

Another object of this invention is the provision of a variable pitch pulley which can be quickly and easily dismantled for service or repair, and which can be as quickly and easily reassembled for use.

To the above ends, the variable pitch pulley of this invention includes a pair of opposed coaxial cone flanges having telescoping tubular hub portions, one of which comprises an axial cylinder defining a fluid pressure chamber. A cooperating piston is axially movable in the chamber and is operatively connected to the other hub portion, for common axial movement therewith, by means including an axial piston rod. The piston rod defines a fluid passageway to the chamber, and is adapted to be connected to a source of fluid under pressure.

DESCRIPTION OF THE DRAWINGS

FIG. 1 is a fragmentary view in axial section of a variable pitch pulley produced in accordance with this invention;

FIG. 2 is a transverse section taken substantially on the line 2—2 of FIG. 1; and FIG. 3 is a view corresponding to a portion of FIG. 1, but showing a different position of some of the parts.

DETAILED DESCRIPTION OF THE PREFERRED EMBODIMENT

In the drawings, an infinitely variable pitch pulley is shown as comprising a pair of cooperating opposed coaxial cone flanges 1 and 2 having opposed conical faces 3 and 4 respectively for engagement with opposite sides of a conventional V-belt 5. The cone flanges 1 and 2 are formed to provide axially extending hubs 6 and 7 respectively, the hub 7 being concentric with the hub 6 and telescopically slidably received therein. The hubs 6 and 7 are further formed to provide diametrically opposed pairs of cooperating keyways 8 and 9 respectively, for reception of keys 10 that are rigidly secured in the keyways 9 by machine screws or the like 11, for axially sliding engagement with the hub 6.

The hub 7 of the cone flange 2 is bored at one end portion to receive a rotary mounting shaft 12 that is secured thereto by means of a key 13 and a pair of set screws 14. The hub 7 is further formed with a counterbore 15 that terminates in an annular shoulder 16, and in which is mounted a cylindrical liner element 17. One end of the liner 17 abuts the annular shoulder 16, and is held thereagainst by an annular wall member 18 engaging the opposite end of the liner element 17 within the bore 15, and a conventional snap ring or the like 19 mounted in a radially inwardly opening annular groove 20 in the hub 7. As shown, the annular wall member 18 projects axially into the liner element 17, and is formed to provide a radially outwardly opening annular groove in which is mounted a sealing ring in the nature of a conventional O-ring 21.

A piston 22 is mounted in the cylinder liner element 17 for axial movements and is rigidly mounted on the reduced inner end portion 23 of a piston rod 24 that extends axially slidably through a central bore 25 in the annular wall element 18. The wall element 18 is internally grooved for reception of sealing rings 26 and 27, the annular wall 18, cylinder liner element 17 and piston 22 cooperating to define a fluid chamber 28. The piston 22 is provided with a radially outwardly opening circumferential groove 29 for reception of an O-ring 30 whereby sealing engagement is had between the piston 22 and cylinder liner element 17.

Axially outwardly of the annular wall element 18, the piston rod 24 is screw threaded to threadedly receive an annular thrust member 31 secured in place by a lock nut 32. The thrust member 31 is formed to provide a radially outwardly projecting circumferential flange 33, the outer hub 6 being counterbored to provide an annular shoulder 34 for abutting engagement with the flange 33.

The piston rod 24 is formed to provide an axial passage 35 that communicates at its inner end with the fluid pressure chamber 28 by means of a radial branch passage 36. The outer end of the fluid passage 35 is counterbored and screw threaded, as indicated at 37, to receive a tubular fitting 38 that is journalled in a non-rotary housing 39, by means of ball bearings or the like 40. The outer end 41 of the fitting 38 is axially aligned with, and is disposed in axially abutting relationship with, a tubular adapter member 42 non-rotatively mounted in the housing 39 for axial sliding movement toward and away from abutting engagement with the outer end 41 of the fitting 38. The adapter member 42 is yieldingly urged into engagement with the end 41 by means of a coil compression spring 43 in the housing 39. The fitting 38, adapter member 42 and housing 39 define respective axial passageways 44, 45 and 46, the latter communicating with a fluid port 47 in the housing 39, the compression spring 43 being disposed in the passageway 46. A washer-equipped sealing ring 48 is disposed between the spring 43 and adapter member 42 to prevent leakage of fluid from the passageway 46 to bearings 40. As shown in FIG. 1, the adapter member 42 is held against rotation by a plurality of circumferentially spaced pins 49 anchored in the housing 39 and disposed between adjacent pairs of circumferentially spaced ears 50 on the adapter member 42. The port 47 is screw threaded to receive a conventional conduit fitting, not shown, for connection to conduit means from a source of fluid, such as air or oil, and suitable control valve means, also not shown.

As shown in FIGS. 1 and 3, when fluid under pressure is introduced to the pressure chamber 28, the piston 22 is caused to move toward the annular shoulder 16, carrying with it the piston rod 24, thrust member 31 and cone flange 1, forcing the V-belt 5 to travel radially outwardly toward its maximum pitch radius shown in FIG. 1. Conversely, when fluid is withdrawn from the pressure chamber 28, the piston 22, piston rod 24 and thrust member 31 are moved toward their position of FIG. 3 by lateral pressure exerted on the cone flange 1 by the V-belt 5, as the V-belt seeks a smaller pitch radius between the cone flanges 1 and 2. It will be appreciated that the pulley of this invention may be used in cooperation with a second variable pitch pulley over which the V-belt 5 is also entrained, the second variable pitch pulley of this invention may be used in cooperation with a fixed pitch pulley having its axis movable toward and away from the fluid pressure operated pulley and yieldingly urged in a direction away therefrom. It will be further understood that the piston 22 may be stopped and held in any desired position of its axial movement between its positions of FIGS. 1 and 3, by merely shutting off flow of pressure fluid to or from the pressure chamber 28. Thus, the effective pitch diameter of the pulley may be infinitely varied between its maximum effective pitch diameter shown in FIG. 1 and its minimum effective pitch diameter shown in FIG. 3.

With the above-described construction, a control valve for the pulley may be located at any convenient point closely adjacent or remote from the pulley.

What is claimed is:
1. A variable pitch pulley comprising:
   (a) a pair of coaxial opposed cone flanges;
   (b) radially inner and outer concentric hub means on said flanges and extending axially from said flanges in telescopic sliding relationship to each other, one of said hub means defining a cylinder;
   (c) a piston in said cylinder and cooperating therewith to define a fluid chamber;
   (d) and means including a cooperating piston rod operatively connecting said piston to the other of said hub means for common axial movement therewith;
   (e) one of said piston rod and cylinder defining a fluid passageway to said chamber and adapted to be connected to a source of fluid under pressure;
   (f) said piston and cylinder being so arranged that fluid under pressure introduced to said chamber will impart movement to one of said cone flanges in a direction axially relative to the other thereof.

2. The variable pitch pulley according to claim 1, characterized by a key secured to one of said hub means, the other of said hub means having an axially extended keyway for sliding reception of said key, whereby to operatively couple said cone flanges for common rotation.

3. The variable pitch pulley according to claim 1 in which said cylinder, piston and piston rod are coaxial with said hub means, said piston rod defining said fluid passageway.

4. The variable pitch pulley according to claim 3 in which said inner hub means defines said cylinder, said means operatively connecting the piston to said one of the hub means comprising an annular thrust member encompassing said piston rod and secured thereto, said thrust member having an outer circumferential edge portion engaging to said outer hub means.

5. The variable pitch pulley according to claim 4 in which said inner hub means includes a tubular shell portion integrally formed with one of said cone flanges, and a cylindrical liner element rigidly mounted in the interior of said tubular shell portion.

6. The variable pitch pulley according to claim 5 in which said inner hub means defines an axial bore in axially spaced relation to said liner element and radially inwardly of its respective cone flange for reception of a rotary shaft.

7. The variable pitch pulley according to claim 5 characterized by an annular member slidably encompassing said piston rod and removably anchored to said tubular shell at one end of said cylindrical liner, said annular member defining one end wall of said chamber.

References Cited
UNITED STATES PATENTS

| | | | |
|---|---|---|---|
| 3,014,378 | 12/1961 | Bruet | 74—230.17 |
| 3,146,633 | 9/1964 | Schmitter | 74—230.17 XR |
| 3,280,649 | 10/1966 | Bruet | 74—230.17 |

FOREIGN PATENTS 604,937   9/1960   Canada.

JAMES A. WONG, Primary Examiner

Disclaimer 3,526,150.—*Noel S. Iverson*, New Ulm, Minn. VARIABLE PITCH PULLEY. Patent dated Sept. 1, 1970. Disclaimer filed May 17, 1971, by the assignee, *New Ulm Manufacturing Company*.

Hereby enters this disclaimer to claims 1, 2, 3, 4 and 6 of said patent.

[*Official Gazette September 7, 1971.*]